United States Patent [19]
Abbey, III et al.

[11] Patent Number: 6,012,369
[45] Date of Patent: Jan. 11, 2000

[54] TUBE CUT-OFF DEVICE HAVING A DIE SET REMOVAL APPARATUS

[75] Inventors: Nelson D. Abbey, III, Monclova; Richard L. Dreier, Northwood, both of Ohio

[73] Assignee: Abbey Etna Machine Company, Perrysburg, Ohio

[21] Appl. No.: 08/976,269

[22] Filed: Nov. 21, 1997

[51] Int. Cl.[7] ............................... B26D 7/00
[52] U.S. Cl. ..................... 83/382; 83/384; 83/564; 83/694; 483/28
[58] Field of Search ................. 83/563, 564, 382, 83/384, 694, 693; 483/28

[56] References Cited

U.S. PATENT DOCUMENTS

| | | | |
|---|---|---|---|
| 3,015,832 | 1/1962 | Zagar | 83/564 X |
| 3,273,433 | 9/1966 | Borzym | 83/54 |
| 3,924,502 | 12/1975 | Borzym | 83/382 X |
| 3,938,415 | 2/1976 | Borzym | 83/385 |
| 4,283,978 | 8/1981 | Kasai et al. | 83/693 X |
| 4,294,147 | 10/1981 | Borzym | 83/382 |
| 4,638,703 | 1/1987 | Muhr | 83/564 X |
| 5,582,062 | 12/1996 | Sommer | 83/563 X |
| 5,619,913 | 4/1997 | Padovani | 483/28 X |
| 5,690,011 | 11/1997 | Hill et al. | 83/382 X |
| 5,784,939 | 7/1998 | Rebeaud | 83/563 |
| 5,827,159 | 10/1998 | Adachi | 83/563 X |

FOREIGN PATENT DOCUMENTS

| | | | |
|---|---|---|---|
| 1223477 | 6/1960 | France | 83/564 |
| 1502929 | 6/1969 | Germany | 83/694 |
| 1945864 | 4/1970 | Germany | 83/563 |
| 3418423 | 11/1985 | Germany | 83/694 |
| 57-109533 | 7/1982 | Japan | 483/28 |
| WO 81/00687 | 3/1981 | WIPO | 83/382 |

*Primary Examiner*—M. Rachuba
*Attorney, Agent, or Firm*—Donald R. Fraser

[57] ABSTRACT

A tube cutting apparatus for cutting a continuously fed elongate tube into predetermined lengths including a removable die set which is mounted at an angle to the horizontal and an associated die set changeover table adapted to receive the die set and tilt the same to a horizontal position to facilitate removal thereof and the positioning of a substitute die set.

6 Claims, 6 Drawing Sheets

6,012,369

1

TUBE CUT-OFF DEVICE HAVING A DIE SET REMOVAL APPARATUS

FIELD OF THE INVENTION

The present invention relates generally to apparatus for cutting off successive lengths of a continuously moving elongate workpiece which is generally tubing or other hollow elongate stock. More particularly, the cut-off apparatus includes means for enabling the cut-off apparatus to be pivotally moved from the position of use to another generally horizontal position to facilitate the removal of one die set and the insertion of another die set.

BACKGROUND OF THE INVENTION

Devices for cutting off successive lengths of a continuously moving elongate workpiece such as tubing being formed in a tube mill are well known in the art. Typically, the tube cut-off apparatus consists of a die set mounted on a rail for selective movement along the length of the tubing. The upper die shoe of the die set is suitably mounted on a rail attached to an orbiting type ram operating in synchronism with the movement of the tubing being formed. The typical apparatus includes a first stage in the cutting which is accomplished by a prepiercing mechanism which includes a piercing blade which is reciprocated across the upper periphery of the tubing after the tubing is suitably clamped within the die set clamping jaws and just prior to the descent of the main cut-off blade. Prepiercing the tubing eliminates dimpling of the tubing.

A special problem is presented when the tube mill is producing tubing of a rectangular or square cross-section. In such instances it is necessary for the main cutter to approach tubing at a forty-five degree angle in respect of the horizontal and to pierce the square tube at the corner where two of the flat sides merge. In this fashion, dimpling of the tube is prevented.

A separate die set apparatus is required for the production of differing sized tubing and tubing formed from stock of differing gauge metal.

Since the die set apparatus is extremely heavy and rather difficult to remove and replace when disposed at an angle to the horizontal, the present invention was conceived.

It is an object of the invention to produce an apparatus which will facilitate the removal and replacement of the die set assemblies from one production run to another production run of tubing of a different size, shape, or wall thickness, for example.

SUMMARY OF THE INVENTION

In accordance with the invention there is provided a die set removal apparatus for use with apparatus for cutting a continuously fed elongate workpiece into predetermined lengths comprising a removable die set for clamping a work piece; a cutter; means for effecting movement of the die set and the cutter along a first path parallel to the longitudinal axis of the workpiece to effect the clamping of the die set to the workpiece and cutting of the workpiece by the cutter without interrupting the movement of the workpiece; a rotary drive means including a rotary shaft, crank shafts, and a ram coupled to the crank shafts for receiving the cutter for reciprocal movement of the cutter toward and away from the workpiece; a changeover table disposed at an extension of the first path for receiving the die set; and means for pivotally mounting the changeover table including motor means for pivotally moving the changeover table.

2

BRIEF DESCRIPTION OF THE DRAWINGS

The above as well as other objects and advantages of the invention may be readily understood by one skilled in the art from reading the following detailed description of an embodiment of the invention when considered in the light of the accompanying drawings, in which.

DETAILED DESCRIPTION OF THE PREFERRED EMBODIMENT OF THE INVENTION

Figure 1:
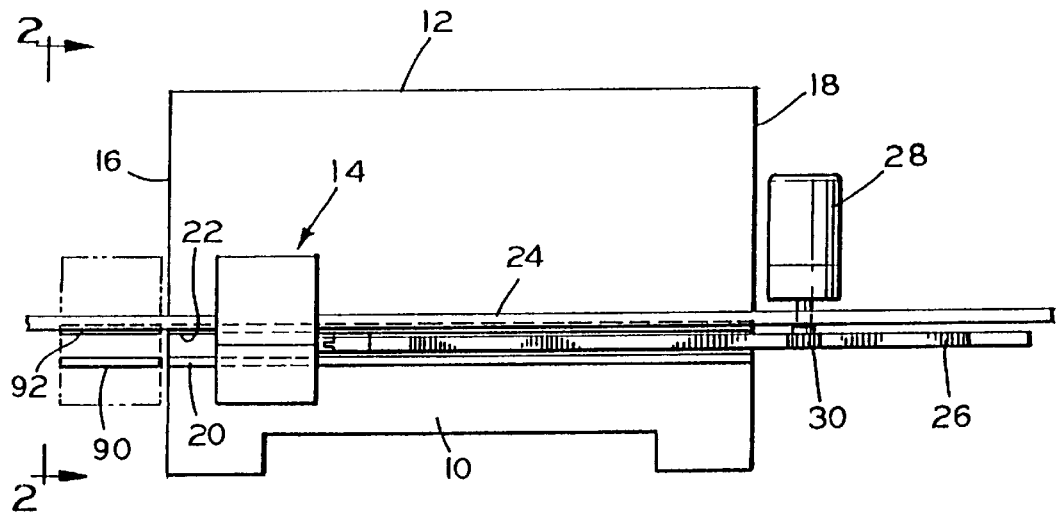
FIG. 1 is a top plan view of a tube cut-off apparatus embodying the features of the present invention.
Figure 2:
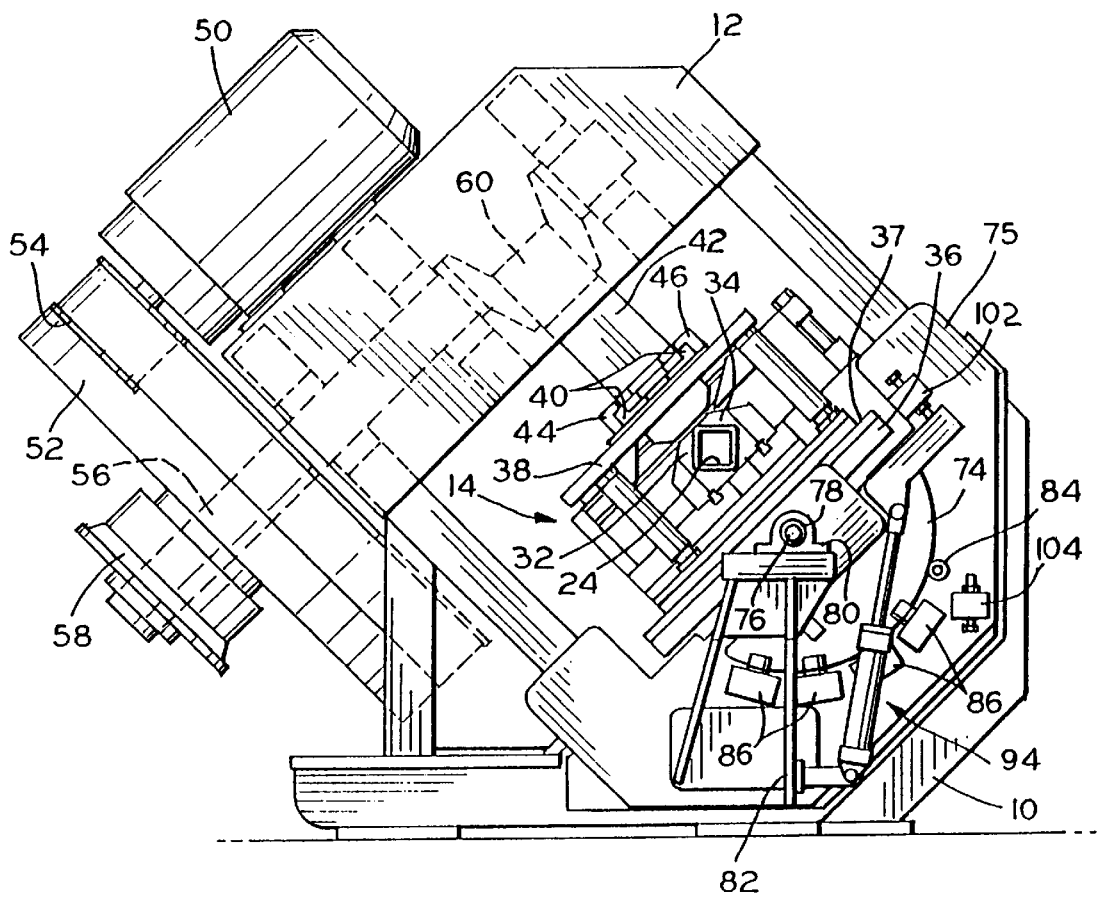
FIG. 2 is an elevational view taken from the left side of the apparatus illustrated in FIG. 1.

Referring to the drawings, there is shown in FIG. 1 a schematic illustration of tube cutting apparatus embodying the features of the invention. More specifically there is illustrated a massive supporting weldment including a base 10 and a gear box 12. A die set 14 is mounted to lower die carriage 36 and moves to and fro between the side walls 16, 18 on suitably positioned guide rails 20,22 which are adapted to extend parallel with the longitudinal axis of the tube 24 being produced by an associated tube mill.

The die set 14 is attached to a rack 26 which, in turn, is driven by a motor 28 and an associated pinion 30. At the completion of a production run, the die set 14 is typically moved to a position outside of the side wall 16 to the left of the base 10, as shown in phantom. In practice, the movement of the die set 14 is limited by shock absorbing devices, as shown for example in FIGS. 7 and 8, mounted at the opposite end walls 16, 18. It is in the phantom position that the present invention is employed to facilitate the removal of the die set 14 and the replacement of another.

As will be more clearly illustrated in FIGS. 2 through 6, the die set 14 includes cooperating tube clamping jaws 32, 34 which are cammed into clamping relation with the tube 24 to be cut. More specifically, the die set 14 includes a lower die shoe 37 and a spaced apart upper die shoe 38. The lower die shoe 37 is supported on a carriage 36 which is provided with guide ways adapted to receive and ride on the guide rails 20,22.

The upper die shoe 38 is coupled to a ram rail 40 of a reciprocating ram 42 by means of attaching gib elements 44, 46.

The reciprocating ram 42 is driven by a motor 50 suitably mounted on the outside of gear box 12. The motor 50 is coupled to a fly wheel 52 by a belt 54. The fly wheel 52 is connected to a rotary shaft 56 through an electrically activated brake and clutch system 58. The rotary shaft 56 includes a crank 60 coupled to the ram 42. It will be understood that the ram 42 and its associated ram rail 40 typically are generally coextensive with the guide rails 20, 22 thereby permitting the die set 14 to move with the travelling tube 24 during the tube cut-off operation as will be explained.

The die set 14 is well known in the art of tube cutting apparatus. Generally, the die set arrangements are often referred to as the double cut type. In such apparatus, there is provided a ram driven tube cutter in which sections of tubing are successively severed from a continuous length thereof by a notching cut followed by a severing cut. A pair of opposed, complemental die jaws are mounted on slides controlled by spaced cam followers carried by the slides. A reciprocating wedge cam engages and forces the cam followers apart to move the slides thereby closing the jaws on the tubing. One of the cam followers typically is comprised of a roller mounted on an eccentric shaft which may be selectively rotated to adjust the clearance between the die jaws. The other cam follower is spring loaded toward the cam within a slide mounting provided in its slide and automatically shifts to an overload position to avoid damage to the mechanism in the event foreign objects become lodged between the die jaws. Such of the die jaws consists of a pair of die jaw portions having spaced, opposed faces defining a slot through which a severing blade may pass. The die jaws are removably mounted on the slides.

It will be understood that in the illustrated embodiment, the downward movement of the ram rail 40 and ram 42 will effectively cause the die jaws 32, 34 to grasp the travelling tube 24. Also, simultaneously, the notching cutter is driven across the tubing to create an initial cut; finally the main cutter is driven downwardly to completely sever the tubing 24.

The above procedure is initiated by energizing the motor 28 which drives the rack 26 and pinion 30 to accelerate the associated die set 14. When the die set 14 reaches the maximum speed of the travelling tubing 24, the brake 58 is released and the associated clutch is actuated causing movement of the drive shaft 56 and simultaneous movement of the cranks 60. The crank means 60 are then caused to move from the twelve o'clock position toward the six o'clock position. The clamping jaws 32,34 of the die set 14 are closed and the notching cut and final severing cut of the tubing are achieved and finalized when the crank 60 reaches the six o'clock position. The motor 50 causes the shaft 56 to rotate bringing the crank 60 to the twelve o'clock position. In the twelve o'clock position the ram rail 40 will be raised by the ram 42 to a position wherein the cutting elements, both the notching cutter and the main cutter, are returned to the respective start positions. Manifestly, this occurs when the upper die shoe 38 of the die set 14 is raised by the upward movement of the ram 42 and the ram rail 40. The accelerator motor 28 is then stopped and reversed to drive the rack 26 in an opposite direction to return to the starting position, illustrated in FIG. 1.

Figure 3:
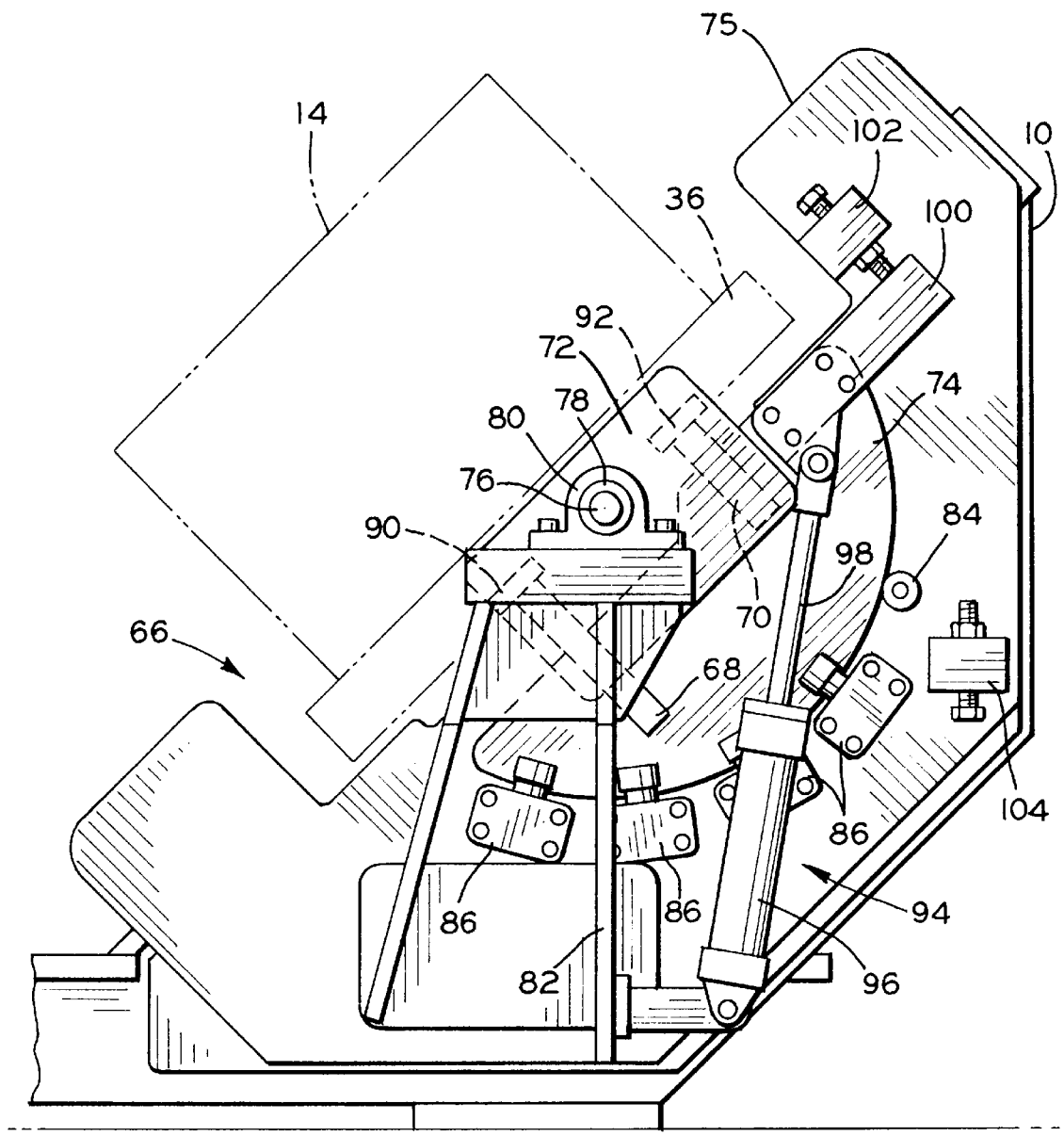
FIG. 3 is an enlarged fragmentary view similar to FIG. 2 showing the die set in its normal operating disposition.

Thus, the apparatus is ready for a sequential cutting operation. The cutting or severing operation continues through an entire production run. When the production run has been completed and it is desired to produce a tubing of different dimensions, the die set 14 must be removed and replaced by another to accommodate the new production. The accelerator motor 28 is energized to drive the pinion 30 to move the rack 26 and the associated die set 14 to a position outside the side wall 16 of the base 10 as illustrated in FIG. 1 in phantom. FIG. 3 illustrates the angular orientation of the die set 14 as it is caused to exit the side wall 16.

The carriage 36 and the associated die set 14 are caused to be moved onto a changeover table, generally indicated by reference numeral 66. The changeover table 66 includes a pair of spaced apart end plates 72, 74.

The end plate 72 is provided with a stub axle 76 which extends laterally outwardly of the end plate 72 and is journalled within a bearing 78 maintained within a bearing block 80. The bearing block 80 is secured, typically by threaded fasteners, to one end of a support arm 82. The opposite end of the support arm 82 is welded or otherwise securely affixed to outside of a mounting plate 75 secured to the outside surface of the side wall 16.

The other end plate 74 has an arcuately shaped peripheral surface adapted to be supported by a series of rollers 84 arranged in spaced relation along an arcuate path adapted to rollingly support the arcuate peripheral edge of the end plate 74. The rollers 84 are individually mounted to extend outwardly of the mounting plate 75, as is relatively clearly illustrated in FIG. 6.

Figure 4:
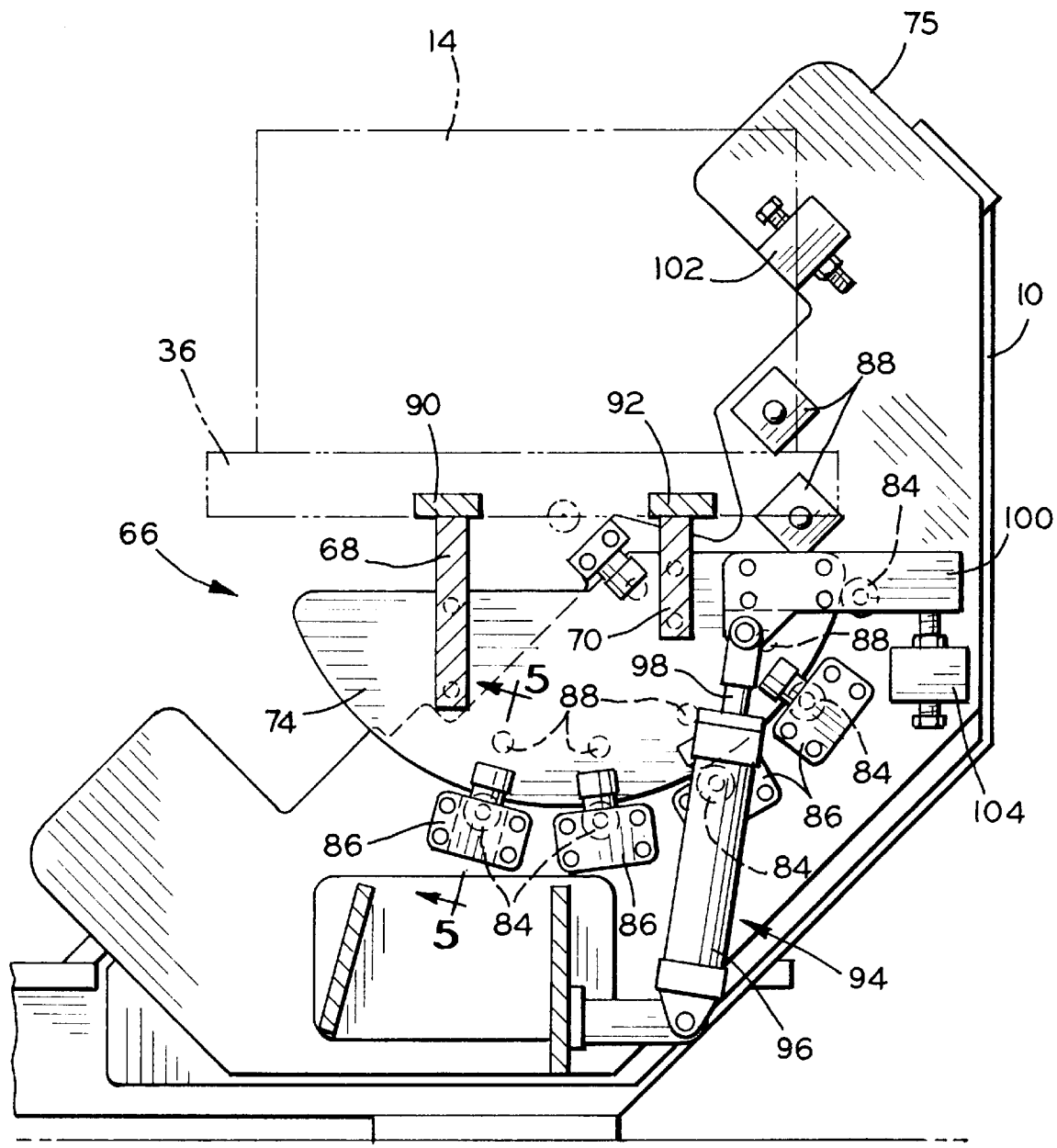
FIG. 4 is an enlarged fragmentary view of the apparatus illustrated in FIG. 3 wherein the die set has been pivotally moved from the normal operating position to a substantially horizontal position and thence linearly moved to facilitate removal of the die set and exchanging the same with a new die set.
Figure 5:
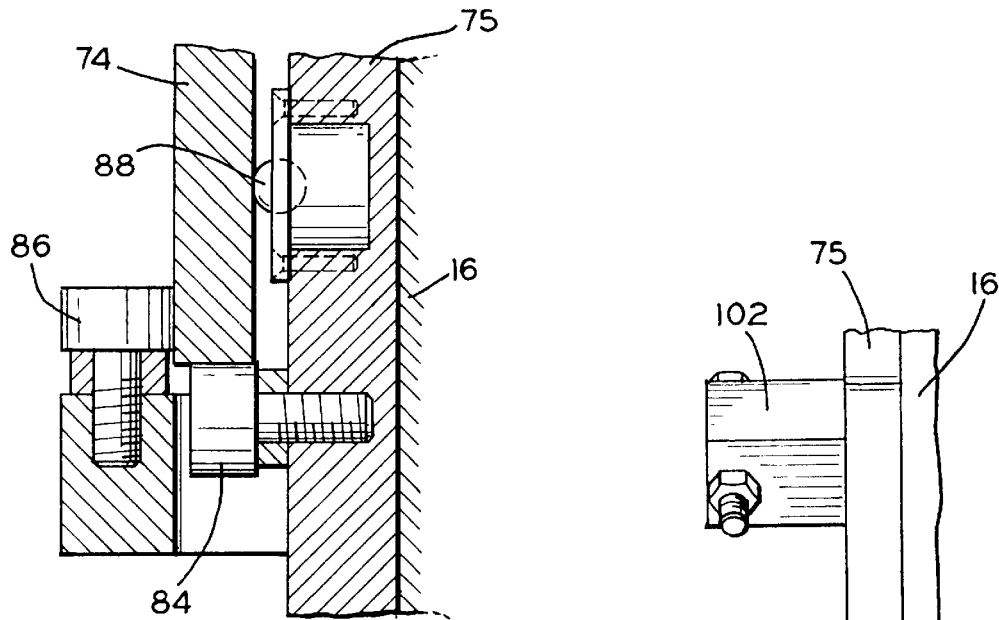
FIG. 5 is a fragmentary sectional view taken along line 5—5 of FIG. 4.

The plate 74 is further supported and retained from lateral movement by a series of spaced apart hold-down roller assemblies 86, illustrated in FIGS. 3 and 4. The roller assemblies 86 are secured to the outer surface of the mounting plate 75. The roller assemblies 86 provide rolling contact with the outer surface of the plate 74, while a series of spaced apart ball caster units 88 (illustrated in FIGS. 4, 5 and 6) are secured to the outer surface of the mounting plate 75 such that the balls of the individual units 88 are in rolling contact with the inner surface of the plate 74.

The rail support members 68, 70 connected to extend between the plate 72 and the plate 74 and include respective rails 90, 92 which, in the tilted position of the plates 72, 74 are in alignment with the guide rails 20, 22, respectively, on which the associated die set 14 is caused to travel. Accordingly, at the completion of a production run, when it is desired to change the die set to produce tubing of a different size, the accelerator motor 28 is commanded to cause the rack 26 to be driven to the left in FIG. 1 to position the associated die set 14 on the changeover table as shown in phantom.

At this stage, the associated die set 14 is in a tilted position. The tilted position of the associated die set 14 is maintained by a pressure fluid actuated motor 94 which included a cylinder 96 having one end thereof pivotally connected to the support arm 82. A piston rod 98 extends from the other end of the cylinder 96 and is pivotally connected to an extension arm 100 affixed to the end plate 74. In the tilted position of the changeover table, the extension arm 100 is in contact with an adjustable stop 102 affixed to the plate 75 of the base 10.

Figure 6:
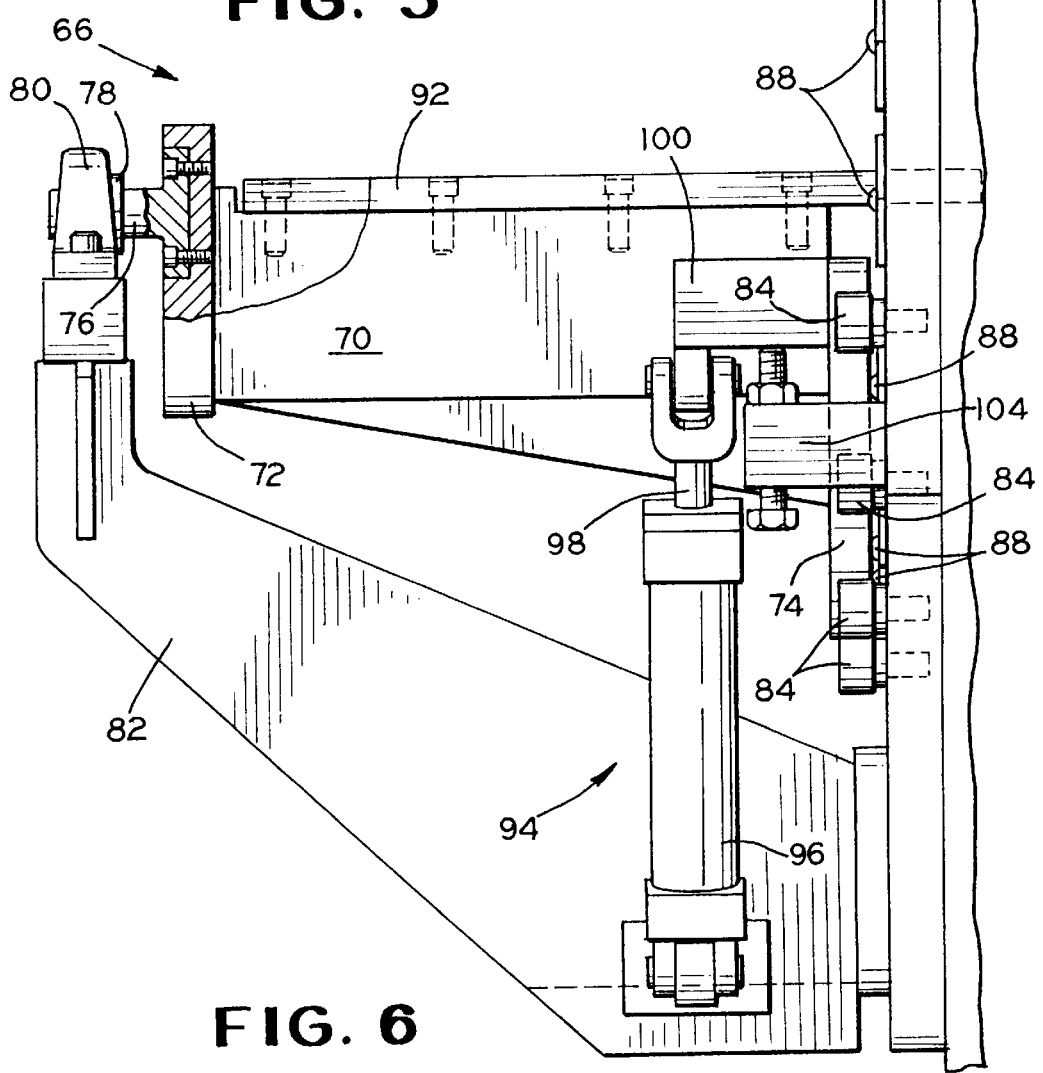
FIG. 6 is an enlarged fragmentary front elevational view of the changeover table for supporting the die set during the changeover procedure and the motor means for effecting pivotal movement thereof.

In order to tilt the changeover table 66 to a horizontal position, as illustrated in FIG. 4, the pressure fluid actuated motor 94 is energized causing the piston rod 98 contract to the position illustrated in FIGS. 4 and 6. When the piston rod 98 contracts, it simultaneously causes the end plates 72, 74, the associated rail supports 68, 70, the rails 90, 92, and the associated die set 14 to rotate about the stub axle 76 until the pivotal action is stopped when the extension arm 100 contacts the stop 104. The changeover table 66 is now in a position facilitating the removal of the die set 14 from the carriage 36. After the die set 14 is removed and placed in a storage area, for example, another die set is positioned on the carriage 36. The changeover table 66 is then pivoted back to the tilted position through appropriate energization of the pressure fluid actuated motor 94. Upon arriving at the desired inclination of the changeover table 66, movement is stopped upon the extension arm 100 making contact with the stop 102. At this stage the rails 90, 92 are in alignment with the rails 20, 22, respectively. Therefore, the new die set can be moved by the rack 26.

Figure 7:
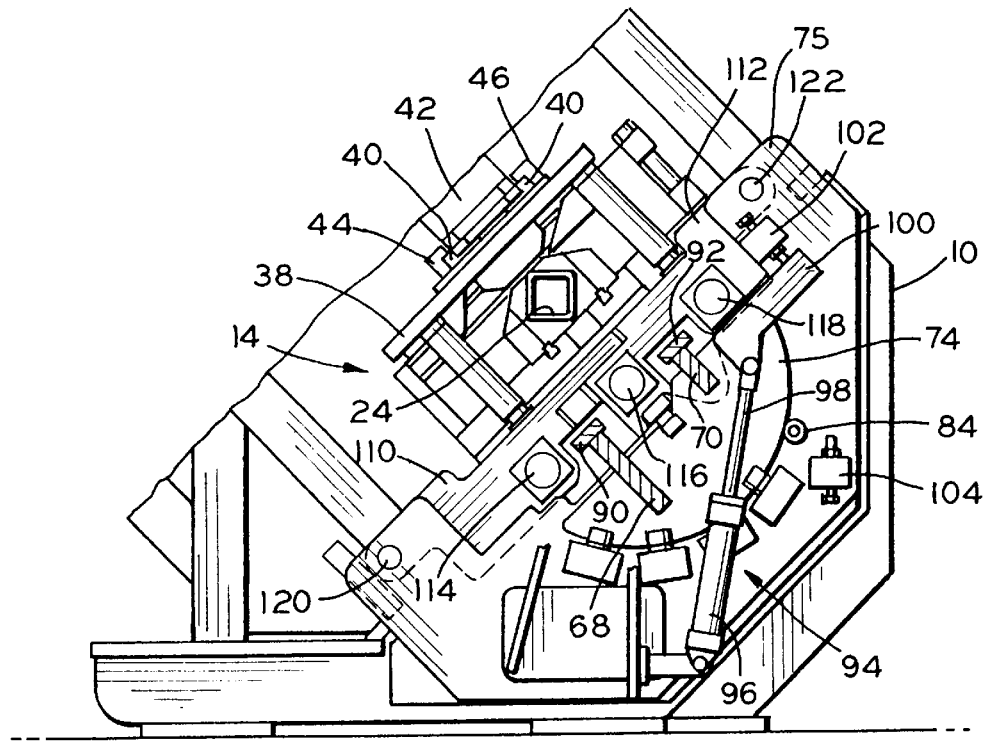
FIG. 7 is a fragmentary side elevational view of an embodiment of the invention illustrated and described in respect of FIGS. 1 through 6, specifically illustrating a gate mechanism to provide protection against accidental transient movement of the die set.
Figure 8:
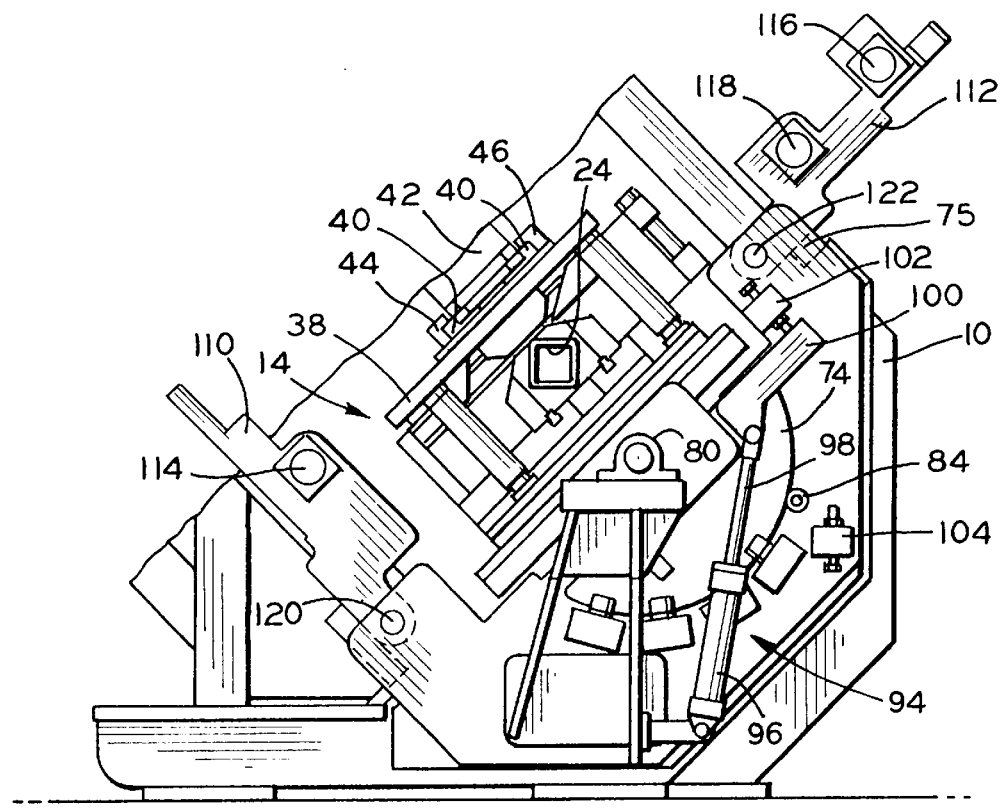
FIG. 8 is a view similar to FIG. 7 showing the gate mechanism in an open position.

FIGS. 7 and 8 illustrate an embodiment of the invention employing a pair of cooperating gate members 110, 112. During the normal tube cutting operation of the apparatus heretofore described, the gate members 110, 112 are designed to be in the position illustrated in FIG. 7. The gate members 110, 112 are provided with shock absorbing devices to absorb the energy of the die set 14 should the drive motor 28 continue to drive the rack 26 beyond the normal stopping position. More specifically, the gate 110 is provided with a shock absorbing device 114, while the gate 112 is provided with spaced apart shock absorbing devices 116, 118.

During a die set change, the gates 110 and 112 must be raised, as illustrated in FIG. 8, to enable the die set 14 to enter onto the changeover table 66 as explained earlier in the description. It will be noted that the gates 110, 112 are pivotally mounted to the plate 75 on pivotal mountings 120, 122, respectively. While the gates 110, 112 may be manually operated, due to the size and resultant weight of these elements motor means may be provided to effect the desired movement.

Figure 10:
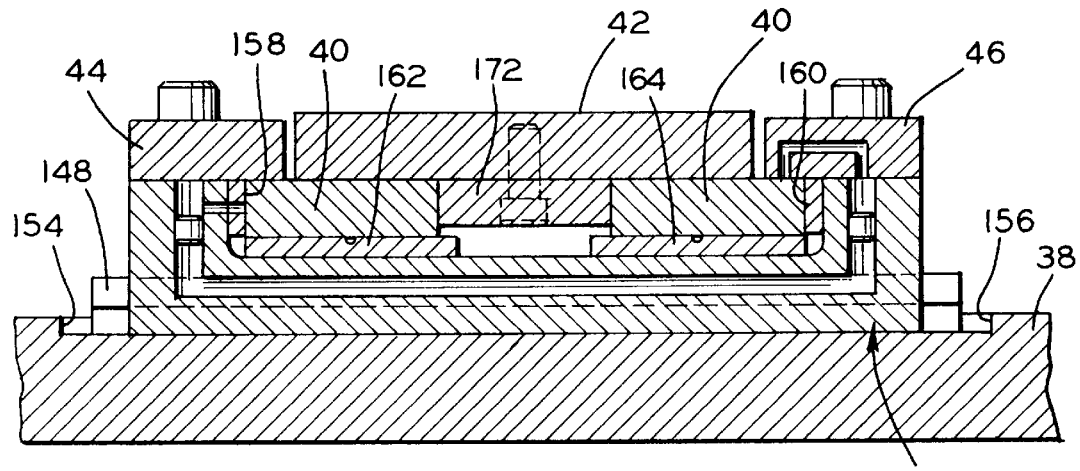
FIG. 10 is a sectional view of the structure illustrated in FIG. 9 subsequent to being moved into operative position.
Figure 9:
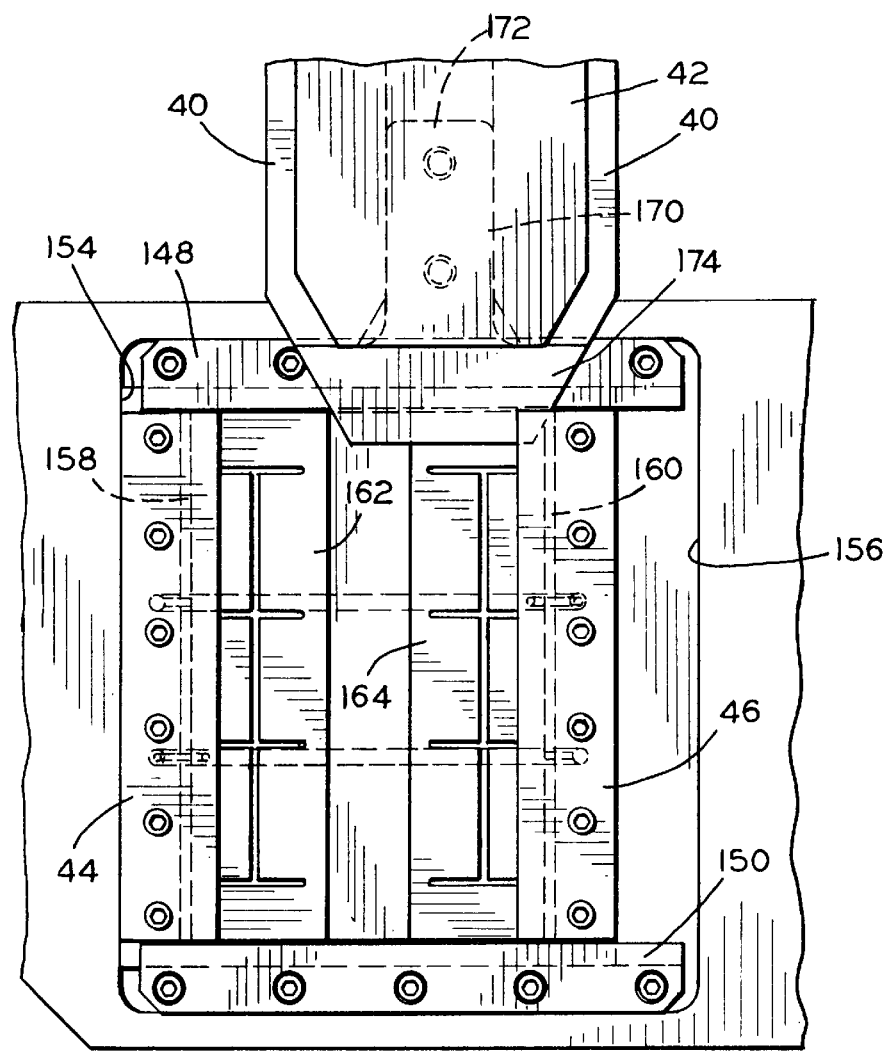
FIG. 9 is a fragmentary top plan view of the terminal end of the ram rail and the gib arrangement for securing a die set to the ram rail prior to being moved into operative position.

FIGS. 9 and 10 illustrate the universal alignment device to effectively assure alignment of die set with the ram rail 40. More specifically, the gib assembly including the gibs 44 and 46 is mounted between end members 148 and 150 which are suitably secured in spaced relation to the upper die shoe 38 of the die set by threaded fasteners, for example. The gibs 44 and 46 are mounted on a wear plate assembly 152 which is free to slide laterally between limits 154, 156 formed in the upper die shoe 38.

The wear plate assembly 152 includes edge wear plates 158, 160 and associated bottom wear plates 162, 164. The wear plates of the assembly 152 may be provided with lubrication receiving grooves to direct the flow of lubricant to adequately lubricate the lower surfaces of the ram rail 40 and the supporting surfaces of the wear plates 158, 160, 162 and 164.

When the die set 14 and its associated carriage 36 are initially being moved into operative position, the terminal end of the ram rail 40 is introduced between the facing edges of the wear plates 158 and 160 tending to cam the assembly to readily permit penetration of the ram rail 40. To facilitate the camming operation, a ram entry guide member 170 is disposed to extend from between the ram rails 40. The member 170 is provided with a tail section 172 which is typically bolted to the underside of the ram 42 and then terminates in a tapered nose section 174 which extends outwardly beyond the limits of the ram 42 and ram rails 40.

In the illustration of FIG. 10, it will be noted that the gib 46 is positioned inwardly of the ends of the end members 148, 150. As the associated die set is moved toward the operative position, the tapered nose section 174 of the ram entry guide member 170 tends to urge the wear plate assembly 152 toward the right until the gibs 44, 46 contact one of the limits 154, 156 whereupon the die set is caused to align with the ram rail 40 as the die set is moved into operative position.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A die set removal apparatus for use with an apparatus for cutting a continuously fed work piece into predetermined lengths comprising:

a removable die set for clamping a work piece;

a cutter;

first rail mounting said die set for movement along a first path parallel to the longitudinal axis of the work piece;

a rotary drive including a rotary shaft, a crank shaft, and a ram coupled to said crank shaft for receiving said cutter for reciprocal movement of said cutter toward and away from the work piece with simultaneous movement of said die set and said cutter parallel to the longitudinal axis of the work piece to effect the clamping of said die set to the work piece and cutting of the work piece by said cutter without interrupting the movement of the work piece;

a changeover table including second rail disposed at an extension of said first path for receiving said die set; and a motor for pivotally moving said changeover table.

2. A die set removal apparatus as defined in claim 1 wherein the ram of said drive means includes a ram rail extending parallel to the longitudinal path of the work piece.

3. A die set removal apparatus as defined in claim 2 including alignment gibs connected to said die set for attachment to the ram of said drive.

4. A die set removal apparatus as defined in claim 3 wherein said alignment gibs includes gib elements mounted to freely move in a plane perpendicular to the longitudinal axis of the work piece.

5. A die set removal apparatus as defined in claim 2 wherein the ram rail of said drive includes a tapered end portion.

6. A die set removal apparatus as defined in claim 5 including an alignment connected to said die set for attachment to the ram rail of said drive.

* * * * *